United States Patent [19]

Yamamoto et al.

[11] Patent Number: 5,598,356
[45] Date of Patent: Jan. 28, 1997

[54] DISPLACEMENT CONVERTING DEVICE AND METHOD FOR MEASURING PRESSURE DIFFERENCES USING SAME

[75] Inventors: Toshihiro Yamamoto; Satoru Nakamura, both of Kanagawa, Japan

[73] Assignee: Fuji Electric Co., Ltd., Kawasaki, Japan

[21] Appl. No.: 322,999

[22] Filed: Oct. 14, 1994

[30] Foreign Application Priority Data

Oct. 14, 1993 [JP] Japan .................................. 5-256198

[51] Int. Cl.$^6$ .............................. G01L 9/12; G01L 19/04
[52] U.S. Cl. .......................... 364/558; 73/708; 73/718; 73/724; 73/861.47; 73/862.52; 361/283.2
[58] Field of Search .................................. 364/481, 551; 73/718, 708, 724, 861.47, 862.52; 361/283

[56] References Cited

U.S. PATENT DOCUMENTS

| | | | |
|---|---|---|---|
| 4,016,764 | 4/1977 | Rice | 73/398 |
| 4,092,696 | 5/1978 | Boesen et al. | 361/283 |
| 4,272,822 | 6/1981 | Yasuhara et al. | 364/481 |
| 4,389,646 | 6/1983 | Tago | 340/870.37 |
| 4,555,952 | 12/1985 | Jenkins | 73/861.47 |
| 4,644,798 | 2/1987 | Tamura et al. | 73/708 |
| 5,000,048 | 3/1991 | Kordts | 73/708 |
| 5,042,308 | 8/1991 | Nakamura et al. | 73/718 |

*Primary Examiner*—Emanuel T. Voeltz
*Assistant Examiner*—Demetra R. Smith
*Attorney, Agent, or Firm*—Morrison Law Firm

[57] ABSTRACT

A displacement converter in which a pressure difference is determined by detecting capacitances C1 and C2 between fixed electrodes 3,4 and a diaphragm 1, which receives pressure differences on both of its sides and can be displaced. The pressure difference is output as a process-unified signal via a V/I converter 209. This eliminates the need for tedious adjustments involving hardware such as a compensation capacitor in order to compensate the floating capacitance in capacitances C1, C2, which is unrelated to diaphragm displacement. Instead, calibration is simplified without decreasing measurement precision.

14 Claims, 7 Drawing Sheets

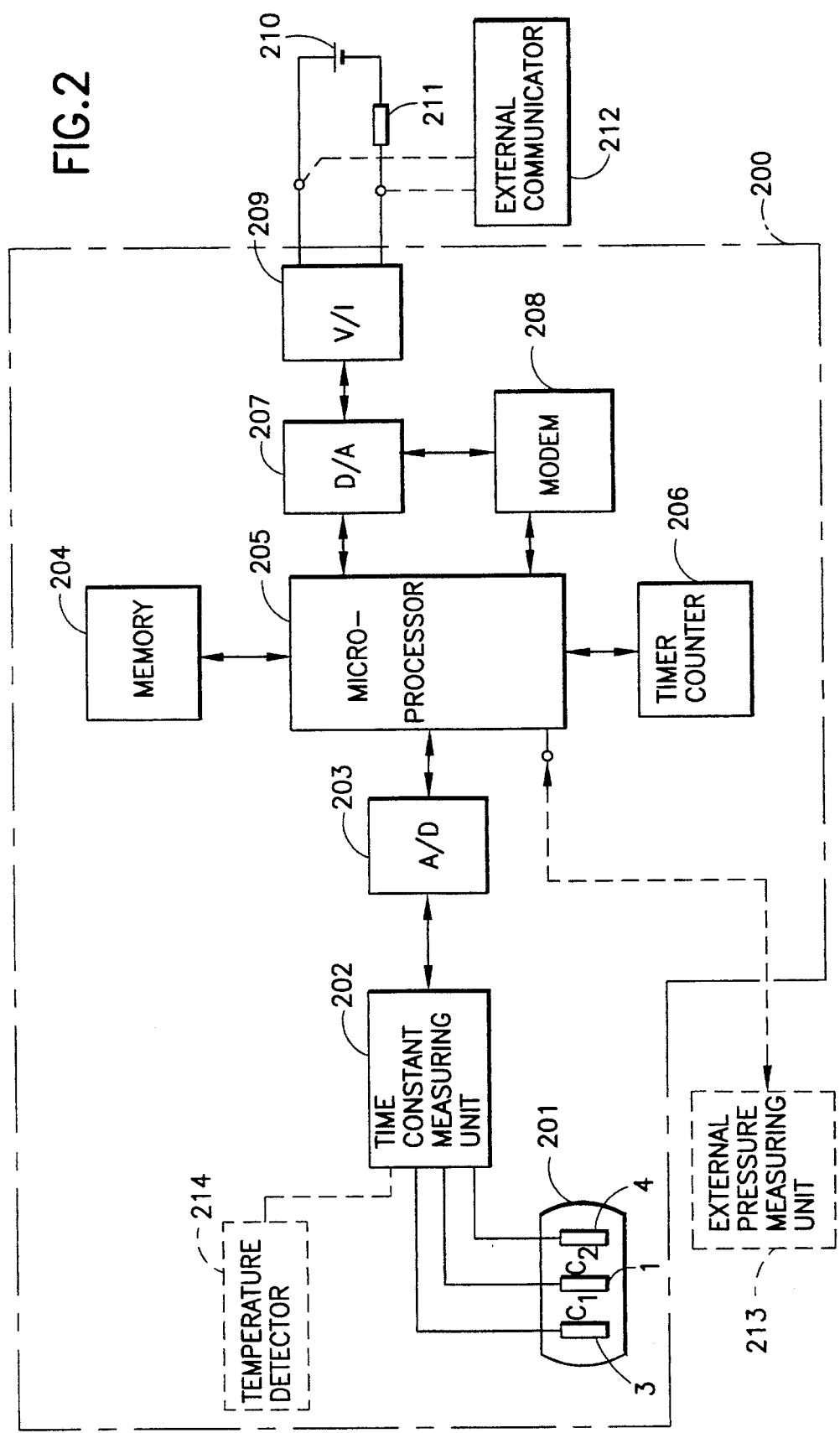

DISPLACEMENT CONVERTING DEVICE AND METHOD FOR MEASURING PRESSURE DIFFERENCES USING SAME

BACKGROUND OF THE INVENTION

The present invention relates to methods for detecting pressure differences and a devices for converting displacements in order to perform process control. More specifically, the present invention relates to a method for detecting pressure differences and a device for converting displacements which detects extremely small displacements in a diaphragm caused by pressure differences as differential changes in capacitance and converts these changes into a unified signal in order to perform process control.

Numerous difficulties are among the longstanding problems with using displacement converters to correct floating capacitances which have been addressed by the devices of the prior art. For example, in parallel flat plate types of sensors, use of known methods makes it possible to determine small diaphragm displacement values, and thus determine pressure differences.

However, conventional conversion characteristics must be measured and re-checked, repeatedly, in order to be confirmed. In practical terms, making high precision adjustments using this method requires numerous trial-and-error attempts. Thus, much time and effort is required to make adjustments.

Additionally, with conventional methods and devices, (such as parallel flat plate types of sensors) linearity is decreased because of changes in floating capacity caused by changes in temperature.

Finally, with regard to temperature characteristics for zero and span, corrections have to be made with combinations of temperature-sensitive resistors, thermistors and the like. However, precise corrections are not possible, requiring onerous trial-and-error attempts too numerous to be efficient.

According to known displacement converters of the parallel flat plate type of sensor type, (such as the present applicant's Japanese patent application no. 63-273120 entitled, DISPLACEMENT CONVERTER WITH IMPROVED LINEARITY) two additional capacitors were employed for compensation of floating capacitance.

The capacitances (or the equivalent capacitances from combinations with resistors and the like) $C_{C1}$ and $C_{C2}$ were adjusted so that $C_{C1}=C_{S1}$ and $C_{C1}=C_{S1}$. A voltage having a prescribed potential and prescribed frequency was applied to capacitances C1, C2, CC1 and CC2 in order to determine (C1–$C_{C1}$) and (C2–$C_{C2}$) from the charge current. By dividing the difference of these two by the sum, the following operation was performed: ( For this application "*" is used as a multiplication symbol "x")

$$\{C1 - C2 - (C_{C1} - C_{C2})\}/\{C1 + C2 - (C_{C1} + C_{C2})\} = \quad (6)$$

$$[\Delta d/d + \delta/d + [\{C_{S1} - C_{S2} - (C_{C1} - C_{C2})\}/2*C_{oo}]*$$

$$\{1 - (\Delta\ d/d + \delta/d)^2\}]/[1 + [\{C_{S1} + C_{S2} - (C_{C1} + C_{C2})\}/2*$$

$$C_{oo}]*\{1 - (\Delta\ d/d + \delta/d)^2\}] = \Delta\ d/d + \delta/d.$$

This equation makes it possible to determine very small displacement delta d of the diaphragm, and thus determine pressure difference P of the two sides of diaphragm 1.

However, as discussed above making high precision adjustments using this method requires numerous trial-and-error attempts, linearity is decreased because of changes in floating capacity caused by changes in temperature, and corrections have to be made with combinations of temperature-sensitive resistors, thermistors and the like. However, precise corrections have not been possible prior to the advent of the present invention.

In sum, among the prior art, hardware methods have been used in displacement converters to correct the floating capacitance contained in capacitances C1, C2 of the sensor capacitors. In the present invention, it is possible to perform linear, zero and span adjustments of a displacement converter easily and accurately. This is done by using capacitances C1(P), C2(P) measured beforehand for a plurality of measurement points with known pressure difference P, in order to calculate constants alpha and beta, which relate to the floating capacitance appearing at prescribed coefficient value f(P).

In contradistinction to known methods, these constants are used to determine function f based on the capacitance for the pressure difference, and the pressure difference is calculated and output. Thus, the floating capacitance is corrected using a software method.

The present invention performs the above corrections for predetermined temperature points beforehand, stores constants for each of these temperature points, measures the temperature as well as the sensor capacitor capacitance values when the pressure difference is measured, and uses the temperature-corrected constant to calculate and output the pressure difference. This provides a displacement converter having good linear, zero and span temperature properties.

OBJECTS AND SUMMARY OF THE INVENTION

Accordingly, it is an object of the invention to provide a method for measuring pressure differences which overcomes the drawbacks of the prior art.

It is a further object of the invention to provide a device for converting displacements which overcomes the drawbacks of the prior art.

It is a still further object of the invention to provide the above objects in a software method for measuring pressure differences and a device for converting displacements which detects extremely small displacements in a diaphragm caused by pressure differences as differential changes in capacitance and converts these changes into a unified signal in order to perform process control.

It is yet a still further object of the invention to provide a displacement converter in which a pressure difference is determined by detecting capacitances between fixed electrodes and a diaphragm which receives pressure differences on both of its side and can be displaced.

Briefly stated, there is provided a displacement converter in which a pressure difference is determined by detecting capacitances C1 and C2 between fixed electrodes 3,4 and a diaphragm 1, which receives pressure differences on both of its sides and can be displaced. The pressure difference is output as a process-unified signal via a V/I converter 209. This eliminates the need for tedious adjustments involving hardware such as a compensation capacitor in order to compensate the floating capacitance in capacitances C1, C2, which is unrelated to diaphragm displacement. Instead, calibration is simplified without decreasing measurement precision.

In accordance with these and other objects of the invention, there is provided a displacement converting device, which comprises, a pair of capacitors formed by a diaphragm and a pair of fixed electrodes arranged and facing either side of a diaphragm, means for measuring capacitance measuring capacitances C1, C2 of said pair of capacitors, first means for calculating constants calculating constants α, β, based on the floating capacitances within said capacitances C1, C2, wherein f(P) of a first operation (1) is linear to a plurality of known pressure differences P in both the negative and positive ranges of said pressure difference P, said device effective for using capacitances C1, C2 of said pair of capacitors measured by said capacitance measuring means, using capacitances C1, C2 of said pair of capacitors measured by said capacitance measuring means during preliminary calibration based on C1(P), C2(P) of said first operation (1) for known pressure differences P, second means for calculating constants calculating f(P) of said first operation (1) during said preliminary calibration for each of said known plurality of pressure differences P, said device effective for using constants α, β calculated by said first means for calculating constants, and capacitances C1(P), C2(P) measured by said means for measuring capacitances for said plurality of known pressure differences P calculating constant f(0) corresponding to f(P) when pressure difference P is 0 based on a second operation (2), which defines the linearity of the two, using values for f(P) and said known pressure differences P, said device effective for calculating a proportional constant KP for a positive range of pressure difference P or (and) a proportion constant KP for a negative range of pressure difference P, means for measuring pressure difference calculating f(P) of operation (1) during pressure difference measurement using constants alpha, beta calculated by first means for calculating constants, and using capacitances C1(P), C2(P) measured by means for measuring capacitance for pressure difference P, and said device effective for calculating pressure difference P from the relationship in operation (2) using said f(P) and using constant f(0) and proportional constant KP calculated by said second means for calculating constants.

According to a further feature of this invention, there is provided a method for measuring pressure difference detecting displacements of a diaphragm caused by pressure difference expressed as a change in capacitance in a pair of capacitors formed by a diaphragm and a pair of fixed electrodes arranged and facing either side of said diaphragm, which comprises measuring capacitances C1, C2 of said pair of capacitors, assuming f(P) of a first operation (1) is linear to pressure difference P, said first operation (1) being defined according to the following formula, f(P)={C1(P)−C2(P)−α}/{C1(P)+C2(P)−β}, according to operation (2), said second operation (2) being defined according to the following formula, f(P)=$K_P$*P+f(0), containing f(0) corresponding to f(P) when pressure difference P=0 and proportional constants KP corresponding to positive and negative ranges of pressure difference P, calculating constants α, β, f(0), KP from operations (1) (2) using capacitances C1(P), C2(P) calculated during preliminary calibration for a plurality of known pressure differences P in a positive or (and) negative range of pressure difference P, and calculating pressure difference P from operations (1) (2) using constants calculated during preliminary calibration and using capacitances C1(P), C2(P) at pressure difference P measured during pressure difference measurement by said means for measuring capacitance.

According to still a further feature of the invention there is provided, method for measuring pressure difference, by detecting capacitances C1 and C2 between fixed electrodes 3,4 and a diaphragm 1, which receives pressure differences on both of its sides and can be displaced, comprising, measuring capacitances C1, C2 of a pair of capacitors, assuming f(P) of a first operation (1) is linear to pressure difference P, said first operation (1) being defined according to the following formula: f(P)={C1(P)−C2(P)−α}/{C1(P)+C2(P)−β} according to operation (2), said second operation (2) being defined according to the following formula: f(P)=$K_P$*P+f(0), containing f(0) corresponding to f(P) when pressure difference P=0 and proportional constants KP corresponding to positive and negative ranges of pressure difference P, calculating constants α, β, f(0), KP from operations (1) (2) using capacitances C1(P), C2(P) calculated during preliminary calibration for a plurality of known pressure differences P in a positive or (and) negative range of pressure difference P and calculating pressure difference P from operations (1) (2) using constants calculated during preliminary calibration and using capacitances C1(P), C2(P) at pressure difference P measured during pressure difference measurement by said means for measuring capacitance wherein each means except said first means for calculating constants is assembled as an integral device, said device setting constants α, β calculated by first memos for calculating constants; and pressure difference P is output as a process-unified signal via a V/I converter 209.

According to yet a still further feature of the invention there is provided a method for measuring pressure difference, by detecting capacitances C1 and C2 between fixed electrodes 3,4 and a diaphragm 1, which receives pressure differences on both of its sides and can be displaced, comprising, measuring capacitances C1, C2 of a pair of capacitors, assuming f(P) of a first operation (1) is linear to pressure difference P, said first operation (1) being defined according to the following formula: f(P)={C1(P)−C2(P)−α}/{C1(P)+C2(P)−β}, according to operation (2), said second operation (2) being defined according to the following formula: f(P)=$K_P$*P+f(0), containing f(0) corresponding to f(P) when pressure difference P=0 and proportional constants KP corresponding to positive and negative ranges of pressure difference P calculating constants α, β, f(0), KP from operations (1) (2) using capacitances C1(P), C2(P) calculated during preliminary calibration for a plurality of known pressure differences P in a positive or (and) negative range of pressure difference P, and calculating pressure difference P from operations (1) (2) using constants calculated during preliminary calibration and using capacitances C1(P), C2(P) at pressure difference P measured during pressure difference measurement by said means for measuring capacitance wherein each means except said first means for calculating constants is assembled as an integral device, said device setting constants α, β calculated by first means for calculating constants; and pressure difference P is output as a process-unified signal via a V/I converter 209.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a schematic drawing of a device for converting displacement according to an embodiment of the present invention.

DETAILED DESCRIPTION OF THE PREFERRED EMBODIMENT

Figure 1A:
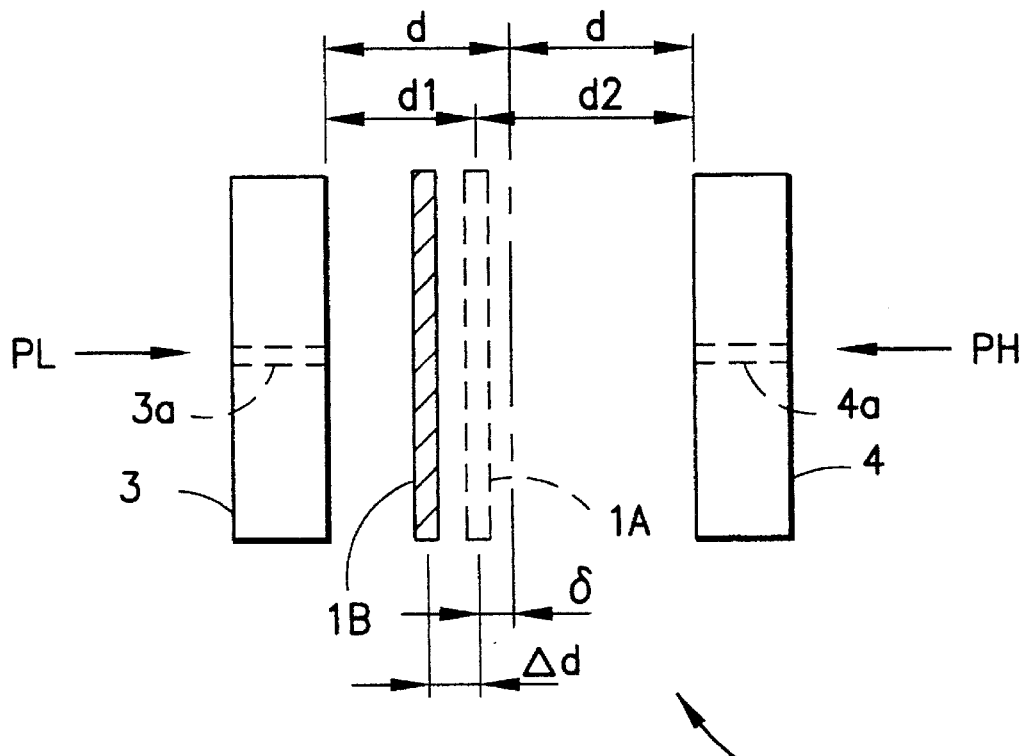
FIG. 1 is a schematic view of a sensor using parallel flat plates of the present invention.

The above objects are achieved in accordance with the teachings of the invention by providing a method and device including an initial calibration mode, in which microprocessor 205 takes a plurality of known pressure differences and measures capacitances C1, C2 using time constant measuring unit 202, A/D converter 203 and timer counter 206. This data, which is needed to determine the constants needed to perform correction on floating capacitance and detection of pressure, is stored in memory 204. In measurement mode, pressure difference is calculated by using the measured capacitances C1, C2 and the constants stored in memory 204. The results are output by the converter via D/A converter 207 and V/I converter 209.

Referring to FIG. 1, a diagrammatic representation describes a parallel flat plate type of sensor. The sensor includes; a movable electrode which comprises a circular plate-shaped diaphragm that is displaced in a parallel direction by a distance of delta d (which is proportional to a pressure difference P (=PH–PL) between the two surfaces), and two fixed electrodes arranged on either side of the diaphragm so that they are parallel to and face the diaphragm.

Figure 1B:
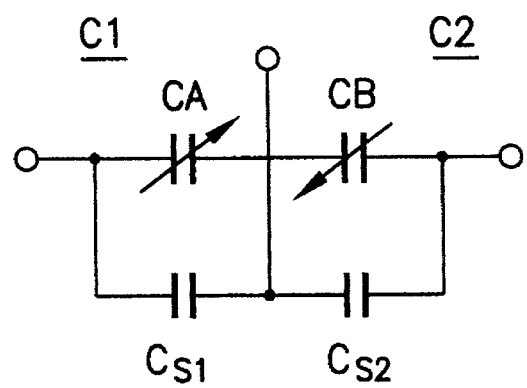

The two fixed electrodes and the movable electrode form a pair of capacitors. FIG. 1(A) shows the arrangement of the electrodes and FIG. 1(B) shows the identical circuit.

In FIG. 1, diaphragm 1 (1A, 1B) indicates a diaphragm (movable electrode) at different displacement positions. Fixed electrodes 3, and 4 are arranged on either side of diaphragm 1 so that they are parallel to the surface of diaphragm 1. PL and PH indicate the negative and positive pressure applied to the left and right surfaces of diaphragm 1 via small holes 3a and 4a arranged on fixed electrodes 3, and 4.

Distance $2_d$ indicates the distance between fixed electrodes 3, and 4. The area of electrodes 1, 3 and 4 are all equal.

Position 1A indicates the position of diaphragm 1 when the pressures applied to diaphragm 1 are PH=PL (i.e. when pressure difference P=0). Distances $d_1$ and $d_2$ indicate the gaps between diaphragm 1 and fixed electrodes 3 and 4 when PH=PL. Similarly, δ indicates a displacement of diaphragm 1 from the center point between fixed electrodes 3 and 4.

Position 1B indicates a position of diaphragm 1 when the applied pressure difference between the diaphragm surfaces is P=PH–PL>0. Delta d is the displacement of diaphragm 1.

Referring to FIG. 1(B), capacitance CA is the part of total capacitance C1 between diaphragm 1 and fixed electrode 3 that changes according to the displacement of diaphragm 1. Similarly, floating capacitance $C_{S1}$ is the part of capacitance C1 that does not change according to the displacement of diaphragm 1.

Capacitance CB is the part of total capacitance C2 between diaphragm 1 and fixed electrode 4 that changes according to the displacement of diaphragm 1. Floating capacitance $C_{S2}$ is the part of capacitance C2 that does not change according to the displacement of diaphragm 1.

In a sensor as in FIG. 1, in which diaphragm 1 is displaced in a parallel direction to fixed electrodes 3 and 4, the capacitances can be expressed by the following equations:

$$C1 = CA + C_{S1} = \epsilon * A/(d1-\Delta d) + C_{S1} = \{C_{OO}/(1-\Delta d/d - \delta/d)\} + C_{S1} \quad (3)$$

$$C2 = CB + C_{S2} = \epsilon * A/(d2+\Delta d) + C_{S2} = \{C_{OO}/(1-\Delta d/d - \delta/d)\} + C_{S2} \quad (4)$$

where:

$$C_{OO} = \epsilon * A/d, \; d=(d1+d2)/2, \; \delta=(d2-d1)/2 \quad (5)$$

and d1,d2: gaps between electrodes (when pressure difference P=0)

Δd: displacement of diaphragm (proportional to pressure difference P)

ε: dielectric constant of dielectric between electrodes

A: electrode area $C_{S1}$, $C_{S2}$: floating capacitance

Referring now to FIG. 2 through FIG. 7, the following is a description of a preferred embodiment of the present invention according to these figures. Like reference designators are used, as possible, to designate the same elements.

Referring to FIG. 2, this embodiment has a displacement converter 200, a sensor 201 comprising a diaphragm 1 and fixed electrode 3, 4 (as described in FIG. 1). A microprocessor 205, serving as an operation control means for controlling this displacement converter, time constant measuring unit 202 for measuring capacitances C1, C2 of the sensor capacitors arranged between diaphragm 1 and fixed electrodes 3 and 4 respectively.

A/D converter 203 performs an A/D conversion of the time constant measured by time constant measuring unit 202 and sends the result to microprocessor 205. Time counter 206 is used for microprocessor 205, in timing operations and the like. Memory 204 serves as memory for microprocessor 205 and stores various constants such as capacitance values. D/A converter 207 converts the measured pressure difference into an analog voltage signal. V/I converter 207 converts a voltage signal into a current signal in a range such as 4–20 mA. Modem 208 produces a modulating signal when the displacement converter sends out digital data externally.

External DC power supply 210, is located outside of displacement converter 200, and serves as the power supply for generating the current signal noted above. External load resistor 211 is for converting the current signal to a voltage signal (for example, in order to convert a 4–20 mA signal to 1–5 V, a 250 ohm resistor would be used).

External communicator 212, is for when displacement converter 200 transmits data externally. External pressure measuring unit 213, serves to measure pressure in cases such as when a known pressure or the like is being applied from outside to sensor 201. Temperature detector 214 is arranged on displacement converter 200 to perform temperature correction and the like for displacement converter 200.

Figure 3:
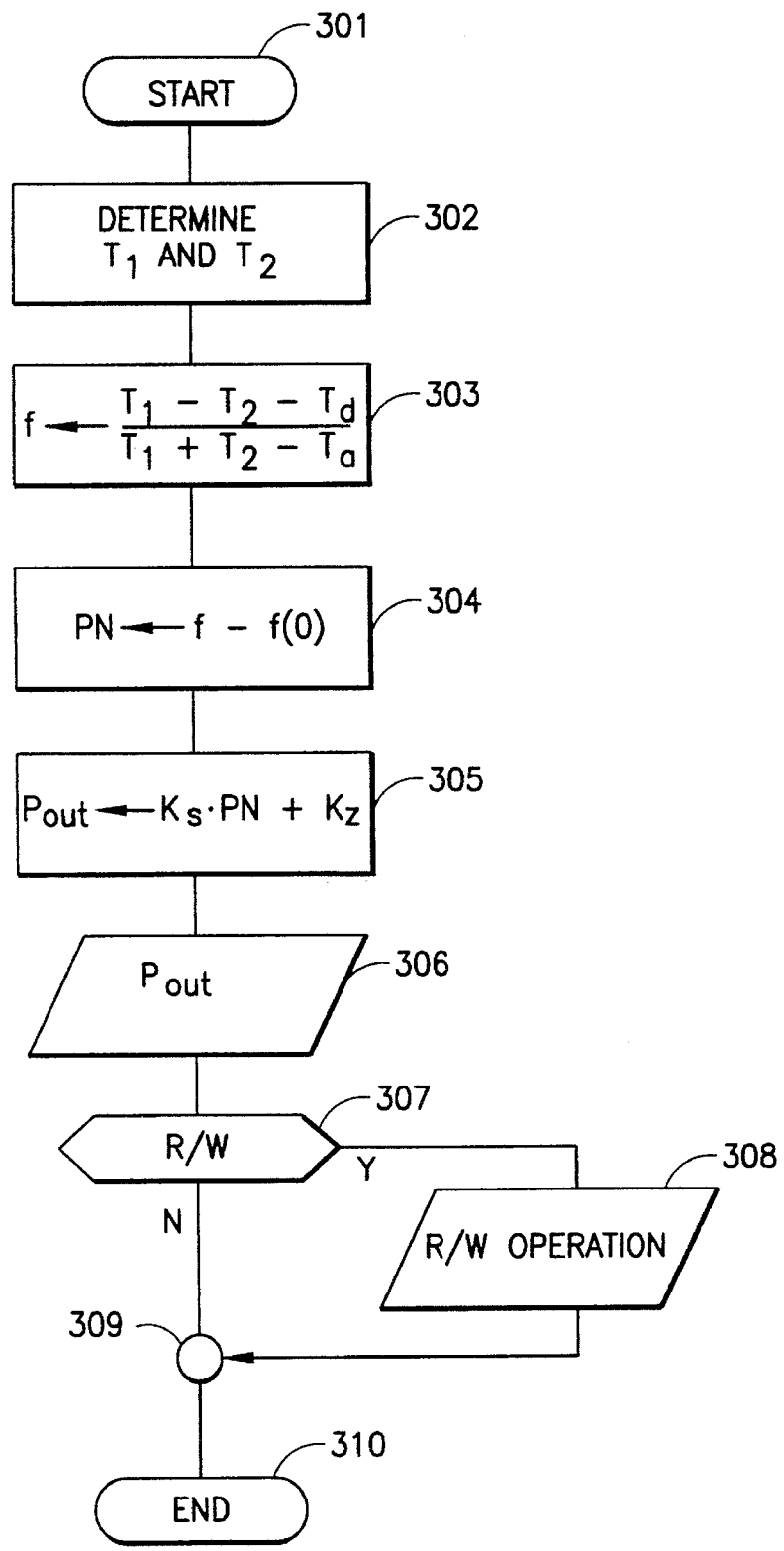
FIG. 3 is flow chart indicating the operations during the measurement mode of a device for converting displacement according to an embodiment of the present invention.

FIG. 3 shows the operations flow of microprocessor 205 when this embodiment is outputting a linear signal (i.e. in measurement mode with pressure difference P). Steps 301–310 represent steps in this flow. At step 302, microprocessor 205 controls time constant measuring unit 202, A/D converter 203 and time counter 206 in order to determine times $T_1$ and $T_2$ which are in proportion to capacitances C1 and C2 of the sensor capacitors.

Times $T_1$ and $T_2$ can be determined by using, for example, the method shown in a previous application by the present applicant (Japanese laid-open publication no. 4-257430). According to this method, a sensor capacitor is charged by a prescribed voltage from a power source via a prescribed resistance, and the time it takes for the capacitor to be charged to a prescribed threshold level is measured.

In another possible method, disclosed by the present applicant in Japanese laid-open publication no. 5-66168, instead of determining times $T_1$ and $T_2$, one of the following are determined to obtain $T_1$ and $T_2$: $(T_1-T_2)$ and $(T_1+T_2)$; $(T_1+T_2)$ and $T_1$ or $T_2$; $(T_1-T_2)$ and $T_1$ or $T_2$.

In the next step, step 303, the reference operation noted in operation (17) (as shown and described below) is performed using time constants $T_d$ and $T_a$ in memory 204.

$$f=(T_1-T_2-T_d)/(T_1+T_2-T_a) \qquad (17)$$

In the next step, step 304, constant f(0) (f when pressure difference is 0 percent) in memory 204 is used to determine PN, the difference between f and f(0). In the next step, step 305, $K_S$ (the span coefficient) and $K_Z$ (the zero coefficient) in memory 204 are used in operation (18) to perform the operations for the output signal for the process handling the pressure difference measurement. In step 306, the result from this, converter output $P_{out}$, is sent to D/A converter 207.

$$P_{out}=K_S*PN+K_Z \qquad (18)$$

The calculation in this described operation (18) provides an output signal $P_{out}$ that is linear to pressure difference P.

For example, referring to FIG. 2, assuming the current signal from V/I converter 209 corresponding to a pressure difference P of 0–100 percent is 4–20 mA, when P=0% (i.e. f=f(0) and PN=0), zero coefficient ZK is the signal element sent to D/A converter 207 so that the current signal from V/I converter 209 is 4 ma. Span coefficient $K_S$ is the signal element sent to D/A converter 207 so that the difference in the current signal from V/I converter 209 from when P=100% and P=0% is 16 mA.

In the next step, step 307, if there is a read/write request for memory 204 from external communicator 212 (e.g. reading $T_1$, $T_2$, writing $T_d$, $T_a$, and the like), the read/write operation is performed on memory at step 308.

Figure 4:
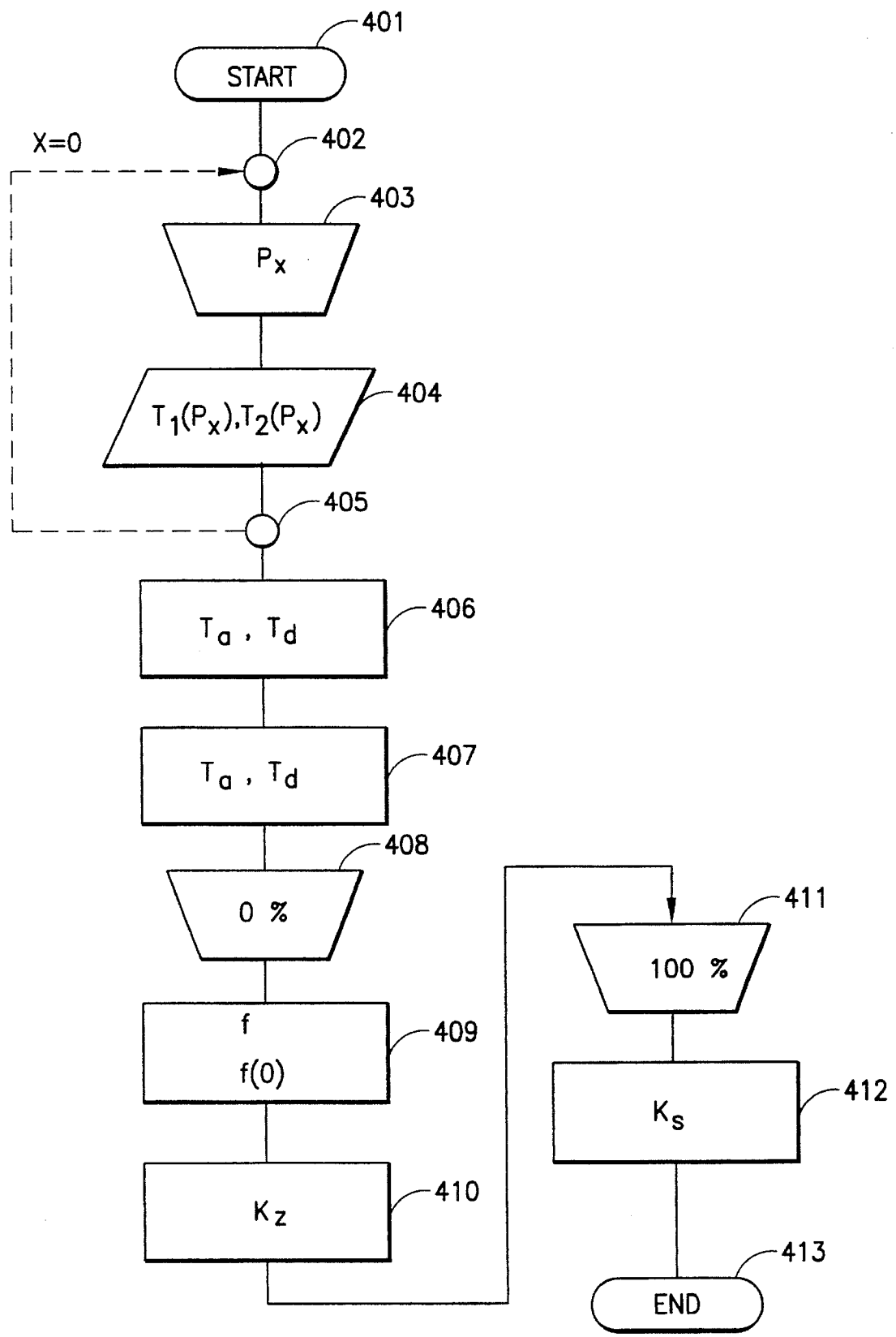
FIG. 4 is a flow chart indicating the operations during the correction mode of a device for converting displacement according to an embodiment of the present invention.

FIG. 4 is a flow chart of steps 401–413 indicating the sequence of operations of microprocessor 205 during output adjustment (calibration) of displacement converter 200. In steps 402–405, data required for the aforementioned constants $T_d$, $T_a$, which are necessary for linear correction, are retrieved. At step 403, applied pressure difference Px (where X is the parameter representing the number of the measurement point) is sent to sensor 201. At step 403 and step 404, detected time values $T_1(P_x)$, $T_2(P_x)$, which are proportional to capacitances C1, C2 of the sensor capacitors, are read from time measuring unit 202. This operation is repeated for X=0–n.

Examples of the types of measurement points include: 1) five points, where pressure difference Px is −100, −50, 0, 50, 100%; 2) four points with 0, 25, 50, 100%; 3) three measurement points for both positive and negative pressure differences, as noted previously (a total of 6 points).

In step 404, referred to above, if displacement conversion takes place by determining the sum and difference of capacitance C1, C2 of the sensor capacitors, a read of $T_1(P_x)+T_2(P_x)$ and $T_1(P_x)-T_2(P_x)$ is performed.

If the displacement conversion takes place by determining capacitance C1 or C2 and their sum, or capacitance C1 or C2 and their difference, a read of $T_1(P_x)$ or $T_2(P_x)$ and $T_1(P_x)-T_2(P_x)$ is performed. At step 406, constants Ta, Td noted above are calculated, and at step 407, the values for Ta and Td are written to memory 204.

In the calculation at step 406, if 5 measurement points (−100, −50, 0, 50, 100%) are used for pressure difference $P_x$ as noted in (1) above, $T_a$ and $T_d$ are determined so that they satisfy the following equations:

$$f(+100)-f(+50)=f(+50)-f(0) \qquad (19)$$

$$f(-100)-f(-50)=f(-50)-f(0) \qquad (20)$$

If 4 measurement points (0, 25, 50, 100%) are used for pressure difference $P_x$ as noted in (2) above, $T_a$ and $T_d$ are determined so that they satisfy the following equations:

$$f(100)-f(50)=f(50)-f(0) \qquad (21)$$

$$f(50)-f(25)=f(25)-f(0) \qquad (22)$$

If six measurement points are used, as noted in (3) above, operations (13) and (16) would be used.

In step 406, it would also be possible to perform the calculations of constants $T_a$, $T_d$ outside of displacement converter 200 instead of having microprocessor 205 perform them. Then at step 407 microprocessor 205 would read in the results of the calculations as $T_a$ and $T_d$, and would write these results to memory 204.

Next, steps 408–410 perform zero-adjustments. At step 408, differential pressure 0% is input. At step 409, the detected time values, $T_1(0)$, $T_2(0)$ and constants $T_a$, $T_d$ stored in memory 204 are used in operation (17) to determine function f(0). This value is written to memory 204 as a constant. As a result, with pressure difference P=0%, operation (18) shows that PN=f–f(0)=0. Therefore $P_{out}=K_Z$. At step 410, zero coefficient $K_Z$ is set so that converter output $P_{out}$ is set at a desired value (e.g. 4 mA), and $K_Z$ is written to memory 204.

Next, in steps 411 and 412, span adjustment is performed. At step 411, a differential pressure of 100% is entered. The detected time values, $T_1(100)$, $T_2(100)$ and constants $T_a$, $T_d$ stored in memory 204 are used in operation (17) to determine f(100). From this can be obtained PN=f(100)–f(0). Using this and the aforementioned zero coefficient KZ, span coefficient KS is determined so that converter output $P_{out}=K_x*PN+K_Z$ can be a determined value (e.g. 20 mA). At step 412, the coefficient is written to memory 204.

Figure 5:
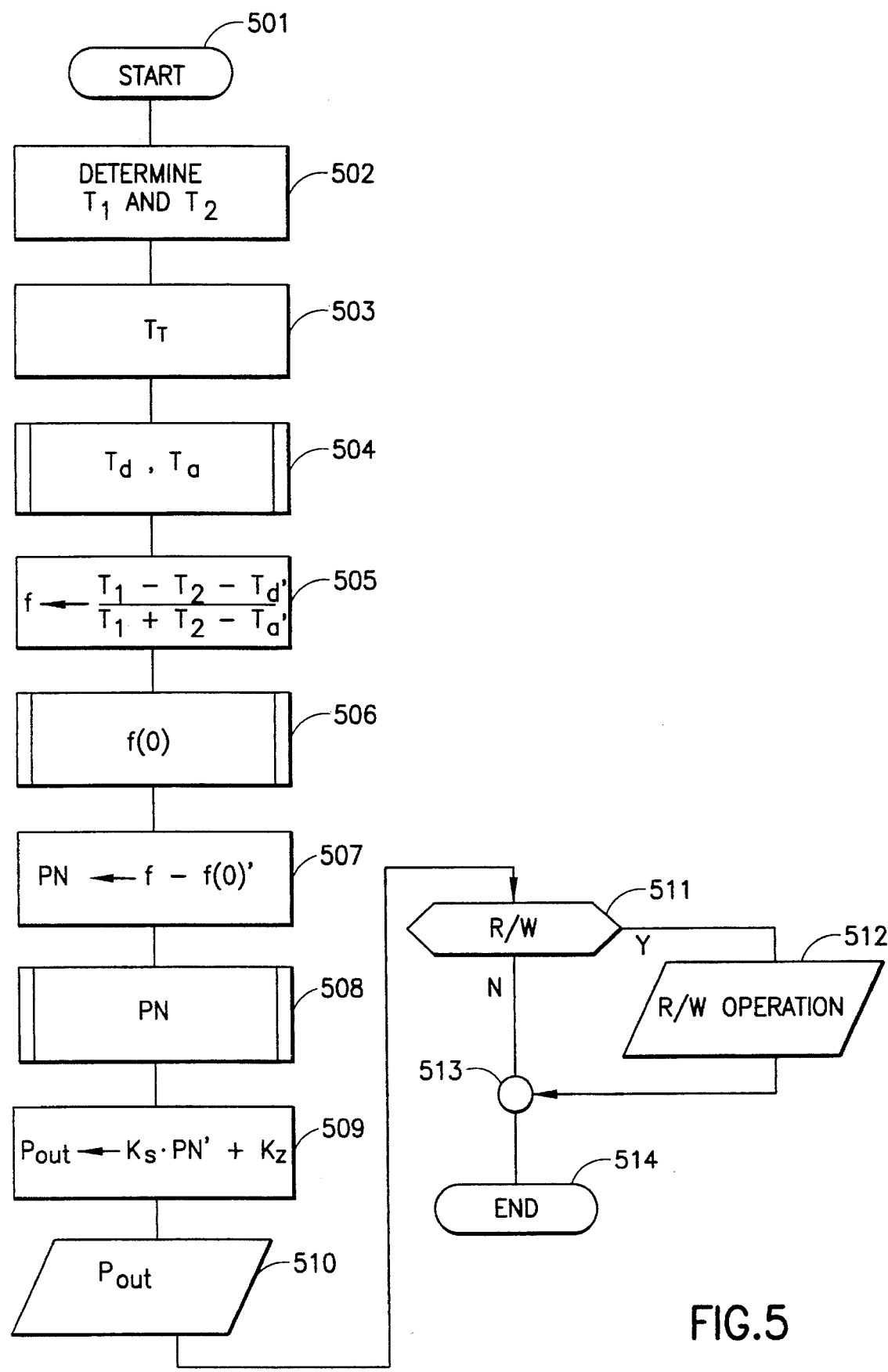
FIG. 5 is a flow chart indicating the operations during temperature correction and measurement mode of a device for converting displacement according to an embodiment of the present invention.

FIG. 5 is a flowchart indicating the operations of microprocessor 205 when displacement converter 200 is outputting linear converter output $P_{out}$, which has been temperature-corrected. Steps 501–514 indicate this process.

At step 502, microprocessor 205 controls time constant measuring unit 202, A/D converter 203 and timer counter 206. Also, time values $T_1$, $T_2$ proportional to capacitances C1 and C2 of the sensor 201 capacitors are determined. At step 503, temperature $T_T$ is measured with temperature detector 214. At step 504, constants $T_d$, $T_a$ that correspond to the current temperature $T_T$ are determined using a data table stored in memory 204 beforehand. This data table contains constants $T_{di}$ and $T_{ai}$ for temperatures $T_{Ti}$ (the "i" in $T_{Ti}$, $T_{di}$ and $T_{ai}$ is a parameter indicating the temperature range of $T_T$, $T_d$ and $T_a$).

Figure 7:
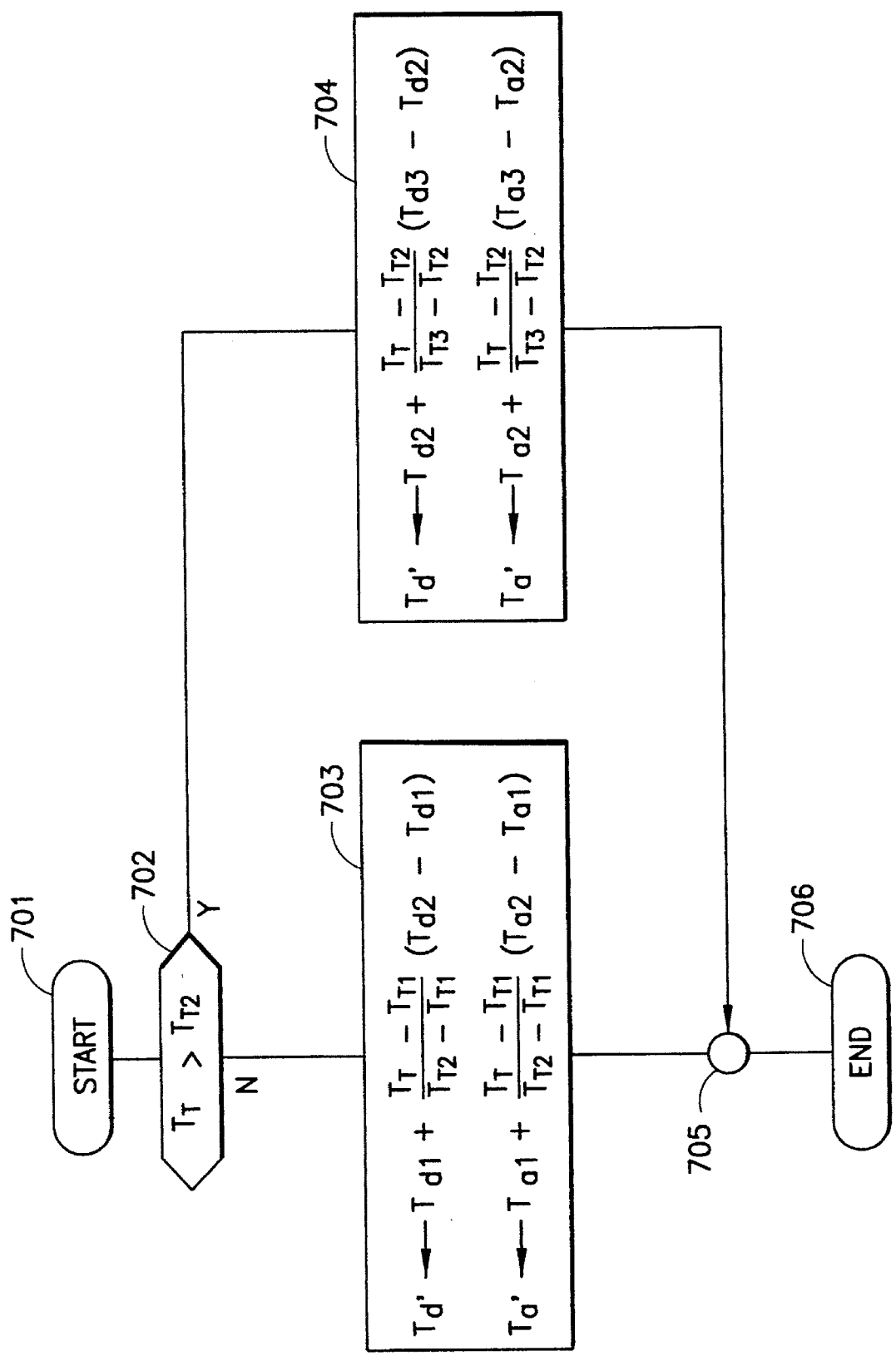
FIG. 7 is a flow chart indicating the process of calculating temperature correction.

FIG. 7 shows an example of the operations procedure for temperature correction. Steps 701–706 perform this procedure. In this example, it is assumed that the data table in memory 204 contains constants ($T_{d1}$, $T_{d2}$, $T_{d3}$ and $T_{a1}$, $T_{a2}$, $T_{a3}$) for the three temperatures for parameters i=1, 2, 3 ($T_{T1}$, $T_{T2}$, $T_{T2}$, where $T_{T1} < T_{T2} < T_{T3}$).

Temperature correction values $T_d{}'$ and $T_a{}'$, which approximate constants $T_d$ and $T_a$, are determined by performing linear approximations between temperatures $T_{T3}$–$T_{T2}$ or temperatures $T_{T2}$–$T_{T1}$ (steps 703, 704) depending on whether measured temperature $T_T$ is greater or less than measured temperature $T_{T2}$ (step 702).

Returning momentarily to FIG. 5, at step 505, detected time values $T_1$, $T_2$ and constants $T_d{}'$ and $T_a{}'$, obtained from step 504, are used to determine function f.

In the next step, step 507, constant f(0) (the f value when differential pressure is 0%), stored in memory beforehand by temperature, is used to determine f(0)' as a value for constant f(0) corresponding to the current measured temperature $T_T$.

In the next step, step 507, temperature correction for the zero point is performed by setting PN to the difference between f and f'(0). In the next step, step 508, operation (23) below is used to perform temperature correction on the span corresponding to the PN value.

$$PN' = PN*PN100(T_{T1})/[(PN100(T_{T2}) - \qquad (23)$$
$$PN100(T_{T1}))(T_T - T_{T1})/(T_{T2} - T_{T1}) + PN100(T_{T1})]$$

PN100($T_{T1}$) and PN100($T_{T2}$) are values of PN when input is 100% at temperatures $T_{T1}$ and $T_{T2}$, which were set beforehand. Temperature $T_{T1}$ is the temperature for which adjustments to zero coefficient KZ and span coefficient KS are performed (this is called the reference temperature). The above equation is the equation for when $T_T <= T_2$. If $T_T > T_2$, then $T_{T1}$ and $T_{T2}$ in operation (23) are reversed.

In the next step, step 509, temperature-corrected converter output $P_{out}$ is determined using operation (24) below. At step 510, the resulting $P_{out}$ is sent to D/A converter 207.

$$P_{out} = K_S * PN' + K_Z \qquad (24)$$

If, at step 511, a memory read/write is requested by external communicator 212, step 512 performs a read/write operation (e.g. a read of $T_1$, $T_2$, a write of $T_d$, $T_a$).

Figure 6:
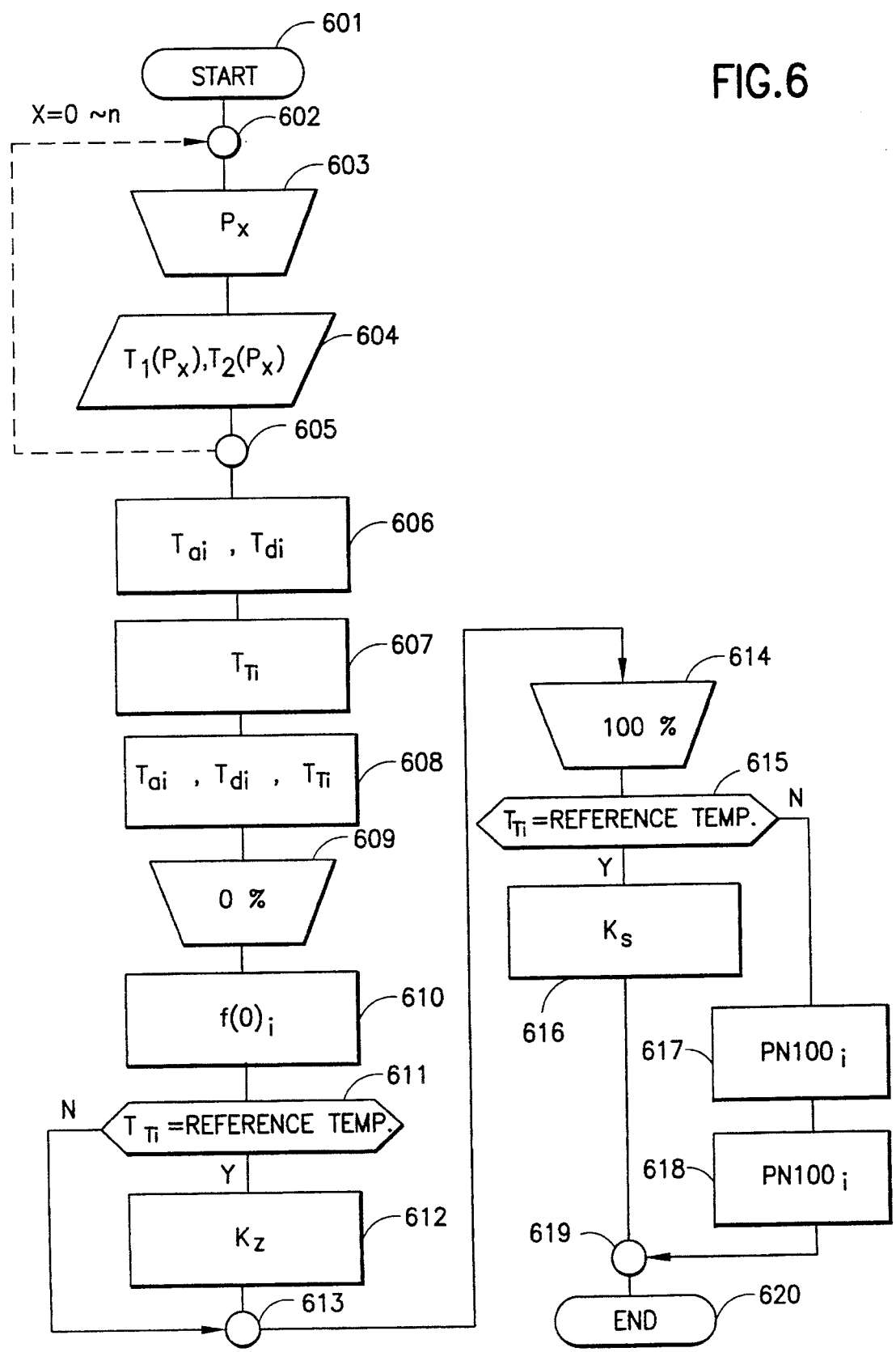
FIG. 6 is a flow chart indicating the operations during linear correction in the calibration mode of a device for converting displacement according to an embodiment of the present invention.

FIG. 6 is a flowchart indicating an embodiment of the operations performed by microprocessor 205 when the output from displacement converter 200 is calibrated so that temperature correction is possible. Steps 601–620 perform this operation. In this case, temperature $T_{Ti}$ is changed to a number of preset temperature points within a certain range (the "i" in $T_{Ti}$ is a parameter indicating the number of the point). For each case (i.e. for each temperature point), a constant is determined according to the procedure in FIG. 6 and stored.

In FIG. 6, assuming that the temperature is in one of the above temperature points, steps 602–605 collects the data necessary for calculating the linear correction constants $T_{di}$ and $T_{ai}$. Next, at step 606, the linear correction constants Tdi and Tai for that temperature is calculated. The operation in steps 602–606 above are identical to steps 402–406 in FIG. 4.

Next, at step 607, current temperature data $T_{Ti}$ is measured using temperature detector 214. Next, at step 608, $T_{di}$, $T_{ai}$ and $T_{Ti}$ are written to memory 204. At step 609, assuming input pressure difference to be 0%, f(0) is measured and is written to memory 204 at step 610.

Next, at step 612, zero coefficient $K_Z$ is written to memory 204 only if the temperature is the reference temperature (step 611, branch Y). Next, at step 614, the input pressure difference is set to 100%, If the temperature is the reference temperature (step 615, branch Y), span coefficient $K_S$ is written to memory 204 at step 616. Meanwhile, if the temperature is not the reference temperature (step 615, branch N), PN100$_i$ is calculated as the PN value in this case at step 617. At step 618, PN100i is written to memory 204.

In prior art, hardware methods have been used in displacement converters to correct the floating capacitance contained in capacitances C1, C2 of the sensor capacitors. In the present invention, it is possible to perform linear, zero and span adjustments of a displacement converter easily and accurately. This is done by using capacitances C1(P), C2(P) measured beforehand for a plurality of measurement points with known pressure difference P, in order to calculate constants α and β, which relate to the floating capacitance appearing at prescribed coefficient value f(P).

Then, these constants are used to determine function f based on the capacitance for the pressure difference, and the pressure difference is calculated and output. Thus, the floating capacitance is corrected using a software method.

The present invention performs the above corrections for predetermined temperature points beforehand, stores constants for each of these temperature points, measures the temperature as well as the sensor capacitor capacitance values when the pressure difference is measured, and uses the temperature-corrected constant to calculate and output the pressure difference. This provides a displacement converter having good linear, zero and span temperature properties.

The reason the results obtained from the method for measuring pressure difference is operational as set forth in claim 1 is further explained as follows.

The method for measuring pressure difference detecting an extremely small movement, delta d, of a diaphragm (e.g. diaphragm 1) is caused by a pressure difference P, as a change in capacitance in a pair of capacitors formed by a diaphragm and two fixed electrodes (e.g. fixed electrodes 3, 4) on either side of and facing the diaphragm.

A means for measuring capacity (time constant measuring unit 202, A/D converter 203, time counter 206, and the like) is arranged to measure capacitances C1, C2 of the pair of capacitors.

At pressure difference P, f(P), as shown in operation (1) above, is based on C1(P) and C2(P), the capacitances of the pair of capacitors measured by means for measuring capacity, and constants α and β, from the floating capacities in the two capacitances C1 and C2.

F(P) is assumed to fulfill linear conditions in relation to pressure difference P according to operation (2), which contains constant f(0) corresponding to f(P) when pressure difference P=0 and proportional constant KP which corresponds to the positive and negative ranges of pressure difference P.

During preliminary calibration, capacitances C1(P) and C2(P) for a plurality of known pressure difference P measurement points in the positive range or (and) negative range of pressure difference P are used to calculate constants α and β, f(0) and KP from operations (1) and (2).

During pressure difference measurement, when measured pressure difference is P, capacitances C1(P) and C2(P) and the constant calculated during the preliminary calibration above are used in operations (1) and (2) to calculate measured pressure difference P.

The device for converting displacement described below is defined by the inventors as follows, it includes a system for converting displacement by determining small displacement, $\Delta d$ of a diaphragm (e.g. diaphragm 1) caused by pressure difference P from the differential change in capacitance in the pair of capacitors formed by the diaphragm and the two fixed electrodes (e.g. electrodes 3, 4) arranged on either side.

The system further includes means for measuring capacitance (time constant measuring unit 202, A/D converter 203, timer counter 206, and the like) measuring capacitances C1 and C2 of the pair of capacitors noted above, first means for calculating constants (microprocessor 205, external communicator 212 or the like) calculating constants alpha, beta, based on the floating capacitance of capacitances C1, C2 where f(P) of operation (1) for a plurality of pressure differences measurement points P in the negative or (and) positive range of P fulfill linear conditions to pressure difference P.

The calculation uses capacitances C1, C2 of the pair of capacitors measured during preliminary calibration by means for measuring capacitance for known pressure difference P in C1(P), C2(P) of operation (1).

Also included are second means for calculating constants (microprocessor 205 or the like) calculating constants KP and f(0). F(P) of operation (1) is derived for each pressure difference P using constants alpha, beta calculated using first means for calculating constants, and C1(P), C2(P), measured during preliminary calibration by means for measuring capacitance for a known plurality of pressure differences P. Based on f(P) and the known pressure differences P, second means for calculating constants calculates the following two elements in operation (2) that determines linearity—proportional constant KP for the positive range or (and) the negative range of pressure difference P, as well as constant f(0) corresponding to function f(P) when pressure difference P is 0.

During pressure difference measurement, constants $\alpha$, $\beta$ calculated by first means for calculating constants and capacitances C1(P), C2(P) measured at pressure difference P by means for measuring capacitance are used to determine f(P) of operation (1). The system further includes means for measuring pressure difference (microprocessor 205 or the like) derives pressure difference P from the relationship in operation (2) using f(P) as well as constant f(0) and proportional constant KP calculated by said second means for calculating constants.

The system for converting displacement of further includes the device for converting displacement described above wherein the means for measuring capacitance determines the capacitances of the pair of capacitors by measuring the difference and the sum of the capacitances.

The system for converting displacement also includes the device for converting displacement described above, wherein the difference of sum of the two capacitances as well as one of the capacitances is measured and the capacitance of the other capacitors is determined.

The system for converting displacement further includes the device for converting displacement further comprising means for detecting temperature (means for detecting temperature 214 or the like) wherein means for calculating (microprocessor 205 or the like) calculates constants alpha, beta corresponding to the temperature detected by means for detecting temperature during pressure difference measurement using constants alpha, beta calculated by said first means for calculating constants using the calibration by temperature for a plurality of temperatures detected by means for detecting temperature. The resulting constants are used by means for measuring pressure difference to calculate f(P).

The device for converting displacement further comprises means for detecting temperature (means for detecting temperature 214 or the like) and means for calculating constants f(0), KP (microprocessor 205 or the like) corresponding to the temperature detected by means for measuring pressure difference during pressure difference measurement using constants f(0), KP calculated by second means for calculating constants based on the calibration by temperature for a plurality of temperatures detected by means for detecting temperature. The resulting constants are used by means for measuring pressure difference for calculating pressure difference P.

The device for converting displacement is also described in that all means except first means for calculating constants can be assembled as an integral device (displacement converter 200 or the like); and the device uses constants calculated by first means for calculating constants.

As described above, the present inventors have discovered that the present invention yields the above described advantages. Further, the following means are used in the present invention:

1) microprocessor 205 serving as means for calculating and controlling 2) time constant measuring unit 202 serving as means for measuring capacitances C1, C2 of the sensor capacitor 3) time constant 206 performing A/D conversion of the time constant obtained from 2)

4) memory 204 storing the determined capacitance 5) memory 204 storing linear correction constants alpha and beta 6) means for performing read/write operations on memory (microprocessor 205)

The following means are also used to prevent decreases in linearity due to changes in floating capacitance caused by variations in temperature:

7) means for detecting temperature (temperature detector 214)

8) memory 204 for storing temperature correction coefficients for alpha and beta The following means are also used to correct temperature characteristics for zero and span.

9) memory 204 storing temperature correction coefficients for zero and span

Pressure difference is measured according to the following method. Instead of using a hardware method for compensating the floating capacitances contained in capacitances C1 and C2 from the sensor capacitor, the floating capacitances are determined by performing an initial calibration in which sensor capacitor capacitances C1(P), C2(P) are measured for a plurality of known pressure differences P. This is then used to perform compensation on floating capacitance (using software methods) when pressure differences are to be measured. * * *

In other words in operation (1) above, $$\alpha = C_{S1} - C_{S2}, \beta = C_{S1} + C_{S2} \qquad (7)$$

and f(P) of operation (1) becomes equivalent to when $C_{C1} = C_{S1}$, $C_{C2} = C_{S2}$ in operation (6) above, and can be expressed as $$f(P) = \Delta d/d + \delta/d \qquad (8)$$

In this equation, diaphragm displacement delta d is proportional to applied pressure difference P, so if proportional constant is set to KP, then $$\Delta d/d = KP*P \tag{9}$$

(However, this proportional constant will generally be different for the positive and negative range of pressure difference P because of the margin of error in the assembly of the diaphragm.)

δ/d is equivalent to f(0) when, displacement delta d=0 (i.e. when pressure difference P=0), so $$\delta/d = f(0) \tag{10}$$

Therefore, f(P) fulfills the linear condition of operation (2).

$$f(P) = K_P * P + f(0) \tag{2}$$

Let us assume that during calibration of the displacement converter, the sensor capacitances C1(P), C2(P) were measured for 3 known separate pressure differences P in the positive range ($P_0$, $P_1$, $P_2$) and for 3 known separate pressure differences P in the negative range ($P_3$, $P_4$, $P_5$).

By taking the difference of the function f for the two pressure difference values $P_0$ and $P_1$, operation (2) shows that $$f(P_1) - f(P_0) = K_P * (P_1 - P_0) \tag{11}$$

Likewise, by taking the difference of function f for pressure differences $P_1$ and $P_2$, $$f(P_2) - f(P_1) = K_P * (P_2 - P_1) \tag{12}$$

The following operation (13) results from operations (11) and (12).

$$f(P_2) - f(P_1) = \{(P_2 - P_1)/(P_1 - P_0)\}\{f(P_1) - f(P_0)\} \tag{13}$$

Likewise, for pressure differences $P_3$, $P_4$, $P_5$, $$f(P_4) - f(P_3) = K_P * (P_4 - P_3) \tag{14}$$

$$f(P_5) - f(P_4) = K_P * (P_5 - P_4) \tag{15}$$

Operations (14) and (15) show that:

$$f(P_5) - f(P_4) = \{(P_5 - P_4)/(P_4 - P_3)\}\{f(P_4) - f(P_3)\} \tag{16}$$

Therefore, the differences and sums of sensor capacitor capacitance values C1, C2 for pressure differences $P_0$–$P_5$ can be obtained, the equations in operations (13) and (16) can be solved, and the unknown constants alpha and beta satisfying operation (8) (and therefore operation (2)) can be determined. Then a pressure difference can be determined linearly by performing operation (1) using constants alpha and beta and capacitances C1 and C2, measured at that pressure difference.

Instead of directly measuring sensor capacitor capacitances C1 and C2, the embodiment below measures the charging times $T_1$ and $T_2$ of the capacitors, which are proportional to the capacitances, under prescribed circuit conditions. Then, instead of the reference operation in operation (1), the following operation is performed.

$$f = (T_1 - T_2 - T_d)/(T_1 + T_2 - T_a) \tag{17}$$

In this operation, $T_d$ and $T_a$ are constants corresponding to α and β.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A displacement converting device, comprising:

a pair of capacitors formed by a diaphragm and a pair of fixed electrodes arranged and facing either side of said diaphragm;

means for measuring capacitances C1, C2 of said pair of capacitors;

first means for calculating constants α, β, based on the floating capacitances within said capacitances C1, C2;

wherein f(P) of a first operation (1) is linear to a plurality of known pressure differences P in both the negative and positive ranges of said pressure difference P;

said device effective for using capacitances C1, C2 of said pair of capacitors measured by said capacitance measuring means, using capacitances C1, C2 of said pair of capacitors measured by said capacitance measuring means during preliminary calibration based on C1(P), C2(P) of said first operation (1) for known pressure differences P;

second means for calculating constants calculating f(P) of said first operation (1) during said preliminary calibration for each of said known plurality of pressure differences P;

said device effective for using constants α, β calculated by said first means for calculating constants, and capacitances C1(P), C2(P) measured by said means for measuring capacitances for said plurality of known pressure differences P, calculating constant f(0) corresponding to f(P) when pressure difference P is 0 based on a second operation (2), which defines the linearity of the two, using values for f(P) and said known pressure differences P;

said device effective for calculating a proportional constant KP for a positive range of pressure difference P or (and) a proportion constant KP for a negative range of pressure difference P;

means for measuring pressure difference calculating f(P) of operation (1) during pressure difference measurement using constants alpha, beta calculated by first means for calculating constants, and using capacitances C1(P), C2(P) measured by means for measuring capacitance for pressure difference P; and said device effective for calculating pressure difference P from the relationship in operation (2) using said f(P) and using constant f(0) and proportional constant KP calculated by said second means for calculating constants.

2. A displacement converting device, according to claim 1, said first operation (1) being defined according to the following formula:

$$f(P)=\{C1(P)-C2(P)-\alpha\}/\{C1(P)+C2(P)-\beta\}. \tag{1}$$

3. A displacement converting device, according to claim 2, said second operation (2) being defined according to the following formula:

$$f(P)=K_P*P+f(0). \tag{2}$$

4. A device for converting displacement as described in claim 3 wherein said means for measuring capacitance measures one of a difference or a sum of the capacitances of said pair of capacitors as well as the capacitance of either one of said capacitors in order to determine the capacitance of the other capacitor.

5. A displacement conversion system according to claim 4, wherein said means for measuring capacitance measures a difference and a sum of the capacitances of said pair of capacitors and derives the capacitances of each of said capacitors.

6. A displacement conversion system according to claim 5, further comprising:

means for detecting temperature; and means for calculating;

said means for calculating constants $\alpha$, $\beta$ for a temperature detected by said means for detecting temperature based on said correction for each of a plurality of temperatures detected by said means for detecting temperature and using $\alpha$, $\beta$ calculated by said first means for calculating constants, and providing said $\alpha$, $\beta$ to said means for measuring pressure difference for calculating f(P).

7. A displacement conversion system according to claim 5, further comprising:

means for detecting temperature; and means for calculating;

said means for calculating constants f(0), KP for a temperature detected by said means for detecting temperature during pressure difference measurement based on said correction using constants f(0), K(P) calculated by said second means for calculating constants, and providing constants f(0), KP to said means for measuring pressure difference for calculating pressure difference P.

8. A displacement conversion system according to claim 5, further comprising:

means for detecting temperature; and means for calculating;

said means for calculating constants $\alpha$, $\beta$ for corresponding to a temperature detected by means for detecting temperature during pressure difference measurement, based on said corrections for each of a plurality of temperatures detected by said means for temperature detection, and using $\alpha$, $\beta$ calculated by said first means for calculating constants, and providing constants $\alpha$, $\beta$ to means for measuring pressure difference for calculating f(P); and means for calculating said means for calculating constants f(0), KP for a temperature detected by said means for detecting temperature during pressure difference measurement using constants f(0), KP calculated by said second means for calculating constants based on said corrections for a plurality of temperatures detected by said means for detecting temperature, and providing said constants f(0), KP to said means for detecting pressure difference for calculating pressure difference P.

9. A displacement conversion system according to claim 6, wherein each means except said first means for calculating constants is assembled as an integral device, said device setting constants $\alpha$, $\beta$ calculated by first means for calculating constants.

10. A displacement conversion system according to claim 7, wherein each means except said first means for calculating constants is assembled as an integral device, said device setting constants $\alpha$, $\beta$ calculated by first means for calculating constants.

11. A displacement conversion system according to claim 8, wherein each means except said first means for calculating constants is assembled as an integral device, said device setting constants $\alpha$, $\beta$ calculated by first means for calculating constants.

12. A method for measuring pressure differences detecting displacements of a diaphragm in a displacement converter caused by pressure difference expressed as a change in capacitance in a pair of capacitors formed by said diaphragm and a pair of fixed electrodes arranged and facing either side of said diaphragm, comprising the steps of:

calibrating said displacement converter by applying a series of specific predetermined pressure differences to said displacement converter at a first calibration temperature, calculating first pressure constants based on said predetermined pressure differences and measured pressure differences, and storing said first pressure constants in a memory;

repeating said calibrating for at least second and third calibration temperatures;

measuring a first and second capacitance of said pair of capacitors;

measuring an actual temperature;

linearly approximating actual pressure constants for said measured temperature by comparing said actual temperature to said first and at least second and third calibration temperatures and interpolating between two of said first and at least second and third calibration temperatures;

calculating a pressure difference using said actual pressure constants for said actual temperature and said first and second capacitance.

13. The method of claim 12, wherein said method further includes the steps of obtaining a value for each of constants $\alpha$, $\beta$, and $K_P$ using a first equation $f(P)=\{C1(P)-C2(P)-\alpha\}/\{C1(P)+C2(P)-\beta\}$, a second equation $f(P)=K_P*P+f(0)$, and said capacitances for each of said series of specific pressure differences where P is the pressure difference, f(0) is the function f(P) when the pressure difference is zero, and C1(P) and C2(P) are capacitances at pressure difference P.

14. The method of claim 12, further including the steps of creating an output signal having a zero level and a span relative to said pressure difference.

\* \* \* \* \*